United States Patent
Bentz et al.

(10) Patent No.: US 6,251,327 B1
(45) Date of Patent: Jun. 26, 2001

(54) HYDROSILYLATION REACTION CURABLE ORGANOSILXANE COMPOSITIONS

(75) Inventors: Peter Otto Bentz, Taunusstein (DE); Hideki Nakahara, Kanagawa (JP); Daniel Francis McMahon, Midland; Edward Burton Scott, Coleman, both of MI (US)

(73) Assignees: Dow Corning Asia, Ltd., Tokyo (JP); Dow Corning Corporation, Midland, MI (US); Dow Corning GmbH, Wiesbaden (DE)

( * ) Notice: Subject to any disclaimer, the term of this patent is extended or adjusted under 35 U.S.C. 154(b) by 0 days.

(21) Appl. No.: 09/656,311

(22) Filed: Sep. 6, 2000

Related U.S. Application Data

(60) Continuation-in-part of application No. 09/244,513, filed on Feb. 4, 1999, now abandoned, which is a division of application No. 08/938,180, filed on Sep. 26, 1997, now abandoned.

(51) Int. Cl.$^7$ .................................. B28B 7/36; B28B 7/38
(52) U.S. Cl. ......................... 264/338; 264/46.6; 528/15; 528/31; 528/32
(58) Field of Search .................... 528/15, 31, 32; 264/338, 46.6

(56) References Cited

U.S. PATENT DOCUMENTS

| | | | |
|---|---|---|---|
| 3,419,593 | 12/1968 | Willing | 260/448.2 |
| 4,654,408 | 3/1987 | Okinoshima | 528/15 |
| 4,879,339 | 11/1989 | Yoshino et al. | 524/740 |
| 5,118,735 | 6/1992 | Burnier | 524/99 |
| 5,519,082 | 5/1996 | Yoshino | 524/493 |

FOREIGN PATENT DOCUMENTS

| | | | |
|---|---|---|---|
| 0 531 009 A1 | 3/1993 | (EP) | C08L/83/07 |
| 0 787 766 A1 | 8/1997 | (EP) | C08K/5/00 |

OTHER PUBLICATIONS

Brandrup et al., "Polymer Handbook", 3rd Ed., pp. 11–67 to 11–142.

Brandrup et al., "Polymer Handbook", 2nd Ed., p. 11–80.

Primary Examiner—David W. Wu
Assistant Examiner—Caixia Lu
(74) Attorney, Agent, or Firm—Larry A. Milco; Robert L. McKellar

(57) ABSTRACT

Hydrosilylation reaction curable organosiloxane compositions containing a scavenger for radicals that participate in the free radical polymerization of styrene monomers, which yield upon cure a silicone elastomers having extended moldlife.

5 Claims, No Drawings

HYDROSILYLATION REACTION CURABLE ORGANOSILXANE COMPOSITIONS

The present application is a continuation-in-part of application Ser. No. 09/244,513 filed Feb. 4, 1999, now abandoned, which is a divisional of application Ser. No. 08,938,180 filed Sep. 26, 1997, now abandoned.

BACKGROUND OF THE INVENTION

1. Field of the Invention

This invention relates to organosiloxane compositions that are curable to form organosiloxane elastomers. More particularly this invention relates to organosiloxane compositions that are curable to form organosiloxane elastomers that exhibit extended moldlife.

2. Description of the Related Art

The prior art also describes organosiloxane compositions that cure to yield crosslinked elastomers by the reaction of a polyorganosiloxanes containing at least two alkenyl groups per molecule with organosilicon compounds containing at least three silicon-bonded hydrogen atoms per molecule as the crosslinker. This reaction is typically catalyzed by platinum containing compounds.

In U.S. Pat. No. 4,879,339, which issued on Nov. 7, 1989, Yoshino et al. disclose a composition comprising a vinyl containing organopolysiloxane; an organohydrogenpolysiloxane; a platinum compound; an aliphatic hydrocarbon; and an antioxidant.

In U.S. Pat. No. 4,654,408, which issued on Mar. 31, 1987, Okinoshima discloses a composition comprising vinyl containing organosilicon compound; a platinum compound; and an antioxidant.

Yet another reference is European Patent Publication 0 531 009 A1, which published on Mar. 10, 1993 in the name of Judith stein, in which there is disclosed a silicone release composition comprising a polydiorgansiloxane containing unsaturated groups, a crosslinking agent containing Si-H groups and a hydrosilation catalyst, which release composition also contains at least one free radical inhibitor to prevent "acrylic weld" to acrylic surfaces.

The compositions of the present invention contain a free radical scavenger for radicals that participate in the free radical polymerization of styrene monomers. These free radical scavengers may be antioxidants. The present inventors discovered compositions containing selected free radical scavengers yield elastomers having unexpectedly improved moldlife.

SUMMARY OF THE INVENTION

The present invention is based on the discovery that adding certain free radical scavengers to hydrosilylation reaction curable organosiloxane compositions extends the mold life of the resulting elastomers.

The present invention relates to a hydrosilylation reaction curable organosiloxane composition comprising:

A) an alkenyl-containing polyorganosiloxane having an average of at least two silicon-bonded alkenyl groups per molecule;

B) an organohydrogensiloxane having an average of at least two silicon-bonded hydrogen atoms per molecule;

C) a hydrosilylation reaction catalyst, in an amount sufficient to accelerate the curing of the composition; and D) a free radical scavenger for radicals that participate in the free radical polymerization of styrene; wherein the sum of the average number of silicon-bonded alkenyl groups in Component (A) and the average number of silicon-bonded hydrogen atoms per molecule in Component (B) is great than 4.

The present invention also relates to a method of increasing the moldlife of a silicone elastomer mold, said method comprising the steps of:

I. preparing a hydrosilylation reaction curable organosiloxane composition containing a free radical scavenger and, curing the curable organosiloxane composition to form a silicone elastomer mold having an increased moldlife.

This invention also deals with a method of molding polyester parts from a mold having enhanced mold life, and finally, this invention deals with molds prepared from silicone Elastomers, wherein the molds have enhanced moldlife.

DETAILED DESCRIPTION OF THE INVENTION

In one embodiment of this invention, there is a composition of matter which relates to a hydrosilylation reaction curable organosiloxane composition comprising:

A) an alkenyl-containing polyorganosiloxane having an average of at least two silicon-bonded alkenyl groups per molecule;

B) an organohydrogensiloxane having an average of at least two silicon-bonded hydrogen atoms per molecule;

C) a hydrosilylation reaction catalyst, in an amount sufficient to accelerate the curing of the composition; and D) a free radical scavenger for radicals that participate in the free radical polymerization of styrene; wherein the sum of the average number of silicon-bonded alkenyl groups in Component (A) and the average number of silicon-bonded hydrogen atoms per molecule in Component (B) is great than 4.

The Alkenyl-Containing Polyorganosiloxane—Component (A)

Component (A) is an polyorganosiloxane containing an average of at least two alkenyl groups per molecule. It is the major Component of the hydrosilylation reaction curable composition of the present invention. In order for this composition to properly crosslink, Component (A) must contain an average of at least two alkenyl groups per molecule. In preferred embodiments, Component (A) contains alkenyl groups having from 2 to 12 carbon atoms. Preferred alkenyl groups are represented by the formula—$R^1CH=CH_2$, where $R^1$ represents a single bond or an alkylene group containing from 2 to 10 carbon atoms. The alkylene group can be linear or branched. Examples of preferred alkenyl groups include, but are not limited to, vinyl, 2-propenyl, 3-butenyl, 5-hexenyl, 7-octenyl and 10-undecenyl. More preferred alkenyl groups are vinyl and hexenyl. In preferred embodiments, at least one alkenyl group is located at the terminal of the molecule chain. In more preferred embodiments, at least two alkenyl groups are located at two of the terminals of the molecular chain.

In preferred embodiments, Component (A) is represented by the general formula:

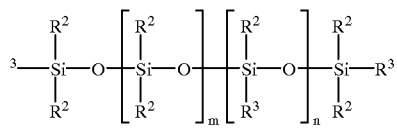

wherein each $R^2$ is individually selected from the group consisting of unsubstituted and substituted monovalent hydrocarbon groups containing from 1 to 20 carbon atoms; $R^3$ is $R^2$ or an alkenyl group; $m \geq 0$; and the value of n is selected such that Component (A) has an average of at least two alkenyl groups per molecule. Preferably $R^2$ is an unsubstituted monovalent hydrocarbon group having less than 7 carbon atoms or a halogenated alkyl group having less than 7 carbon atoms. More preferably $R^2$ is alkyl group, such as methyl or ethyl, a cycloalkyl group such as cyclohexyl, an aryl group, such as phenyl, or a halogenated alkyl group, such as chloromethyl, 3-chloropropyl or 3,3,3-trifluoropropyl. Most preferably, $R^2$ is methyl. In preferred embodiments, n is zero.

Generally the siloxane is polymerized to a viscosity from 0.03 to 500 Pa.s at 25° C., preferably from 2 to 250 Pa.s. It is possible to use either higher or lower viscosity polymers.

The polyorganosiloxane of the present invention may be a homopolymer, or a copolymer. A single polyorganosiloxane can be used or a mixture of different polyorganosiloxanes.

Methods for preparing the polyorganosiloxanes of Component (A) are sufficiently disclosed in the patent and other literature such that a detailed description in this specification is not necessary.

The Organohydrogensiloxane—Component (B)

Component (B) of the present invention is an organohydrogensiloxane containing an average of at least two silicon-bonded hydrogen atoms per molecule. It is used to crosslink the composition of the present invention. The silicon-bonded hydrogen atoms in Component (B) react with the alkenyl groups in Component (A) in order to cure the composition of the present invention. In order for the composition of the present invention to cure to a silicone elastomer, the sum of the average number of silicon-bonded alkenyl groups per molecule in Component (A) and the average number of silicon-bonded hydrogen atoms per molecule in Component (B) must be greater than 4.

Organohydrogensiloxanes that may be used as Component (B) preferably contain an average of more than two silicon-bonded hydrogen atoms per molecule, and more preferably contain an average of at least three silicon-bonded hydrogen atoms per molecule. The remaining valances on the silicon atoms are satisfied with organic groups selected from alkyl groups having less than 7 carbon atoms, halogenated alkyl groups having less than 7 carbon atoms and aryl groups. The preferred aryl group is phenyl. Preferred alkyl groups are methyl, ethyl, and hexyl. Most preferred alkyl groups are methyl groups. The preferred halogenated alkyl group is 3,3,3,-trifluoropropyl.

The organohydrogensiloxane of Component (B) can have a linear or branched structure, and can be a homopolymer, a copolymer, or a mixtures of these types of polymers.

Polymers that are suitable for use as Component (B) include, but are not limited to, polymethylhydrogensiloxane; trimethylsiloxy-terminated polymethylhydrogensiloxane; copolymers of dimethylsiloxane, methylhydrogensiloxane, and trimethylsiloxane units; and copolymers of dimethylsiloxane, methylhydrogensiloxane, and dimethylhydrogensiloxane units.

A preferred linear type of organohydrogensiloxane has a viscosity of from 0.01 to 10 Pa.s at 25° C. and comprises dialkylsiloxane and alkylhydrogensiloxane units with trialkylsiloxy terminal units. The alkyl groups contain from 1 to 4 carbon atoms and are most preferably methyl.

The amount of Component (B) used should be sufficient to provide the desired degree of crosslinking during cure. Generally, the proportion of Component (B) in the composition of the present invention is an amount ranging from 1 to 40 parts by weight per 100 parts of Component (A). In preferred embodiments, Component (B) is present in an amount ranging from 5 to 30 parts per 100 parts of Component (A). In more preferred embodiments, Component (B) is present in an amount ranging from 7 to 20 parts per 100 parts of Component (A).

The molar ratio of silicon-bonded hydrogen atoms to vinyl or other ethylenically unsaturated hydrocarbon groups in compositions curable by a hydrosilylation reaction is important with respect to the properties of the cured elastomer. The optimum ratio for the present curable compositions will be determined at least in part by the molecular weight of the polyorganosiloxane and the type of crosslinking agent. The relative concentration of organohydrogensiloxane (Component (B)) and polyorganosiloxane (Component (A)) in the composition of the present invention is equivalent to a molar ratio of silicon-bonded hydrogen atoms to alkenyl radicals that is typically from 0.5:1 to 20:1, more preferably 1:1 to 5:1.

The Hydrosilylation Reaction Catalyst—Component (C)

Component (C) is a metal from the platinum group of the periodic table or a compound of such a metal. These metals include platinum, palladium and rhodium. Platinum and platinum compounds are preferred based on the high activity level of these catalysts in hydrosilylation reactions. Catalysts that may be used as Component (C) in the organosiloxane composition of the present invention are any of the known forms that are effective in promoting the reaction of—SiH groups with silicon-bonded alkenyl groups.

Suitable forms of platinum include, but are not limited to, chloroplatinic acid, platinum compounds and complexes of platinum compounds with unsaturated organic compounds or with siloxanes having silicon-bonded groups containing ethylenically unsaturated groups. Additional examples of suitable platinum catalysts include complexes of platinous halides or chloroplatinic acid with divinyltetramethyldisiloxane and tetramethyldisiloxane. Suitable platinum catalysts are described in U.S. Pat. No. 3,419,593, which issued on Dec. 31, 1968, and which is incorporated herein by reference for what it teaches about the preparation of such catalysts.

The concentration of Component (C) in the present composition is equivalent to a platinum concentration of 0.1 to 500 parts by weight of platinum metal, preferably from 5 to 250 parts by weight of platinum metal, and more preferably 25 to 100 parts by weight of platinum metal, per million parts (ppm), based on the combined weights of Components (A) and (B).

The Free Radical Scavenger (Component (D))

Component (D) is a free radical scavenger for styrene free radical polymerization radicals. By the term "styrene free radical polymerization radicals" we mean those radicals that are capable of participating in the free radical polymerization of styrene monomers. Component (D) functions to increase the mold life of the organosiloxane elastomer that results when the composition of the present invention is cured.

A curable polyester composition is frequently used to make castings when it is desirable to make a large number of inexpensive reproductions, such as when manufactures wish to produce and sell small figurines in large quantities. A curable polyester composition is typically comprised of a base resin and a curing agent. The curable polyester composition may also contain cure accelerators or other additives. The base resin is typically composed of a polyester resin and styrene monomers. The curing agent is typically a peroxide. The curable polyester composition cures via a styrene free radical polymerization reaction. The peroxide reacts with the styrene monomers to form styrene radicals. The styrene radicals react with the polyester resin and with each other to cure the curable polyester composition. If a sufficient quantity of a sufficiently reactive free radical scavenger is introduced into the curable polyester composition, the cure of the composition will be inhibited. The cure of the curable polyester composition may be prevented or the rate at which the curable polyester composition will cure may be decreased. The present inventors discovered that the mold life of an organosiloxane elastomer mold in which polyester castings will be made can be significantly increased by incorporating chemical compounds which are capable of scavenging the free radicals that participate in the free radical polymerization of styrene. Many chemical compounds which are capable of scavenging these free radicals are known and can found in scientific literature. One such list can be found on pages II-67 to II-142 of the $3^{rd}$ Edition of the Polymer Handbook edited by J. Brandrup and E. H. Immergut. Another list can be found on beginning on page II-80 of the $2^{nd}$ Edition of the Polymer Handbook. A person of ordinary skill in the art can determine whether a particular chemical compound which is listed in such handbooks, or whether any known antioxidant may be used as Component (D), by conducting a simple experiment. In order to determine whether a particular chemical compound (hereinafter "Compound X") will act as a free radical scavenger for styrene free radical polymerization radicals, 200 grams of a curable polyester composition ("Composition 1") should be prepared. Composition 1 should be comprised of 100 parts of a polyester base, 1 part of a curing agent, and 0.165 part of a cure accelerator. The polyester base should be comprised of polyester resin and styrene monomers. The preferred ratio of polyester resin to styrene monomers in Composition 1 is 60:40. "SILMAR" Resin S40 can be used as the polyester base. "SILMAR" is a registered trademark of BP Chemicals, Inc., of Cleveland, Ohio. The curing agent should be comprised of a peroxide. The preferred peroxide is methyl ethyl ketone peroxide. The preferred cure accelerator is 90 wt. % N, N dimethylaniline and 10 wt. % cobalt naphthenate. One hundred grams of Composition 1 should be allowed to cure under room temperature conditions. The time that it takes for this composition to cure to a solid should be measured and recorded as $T_1$. One thousand parts of Compound X per one million parts of Composition 1 should be added to 100 grams of Composition 1 in order to form Composition 2. The time that it takes Composition 2 to cure to a solid state should be measured and recorded as $T_2$. If $T_2>1.2T_1$, then Compound X is a free radical scavenger for styrene free radical polymerization radicals.

The preferred free radical scavenger is a chemical compound which is miscible with Components (A) and (B) and which does not interfere with the catalytic properties of Component (C). Because sulfur-containing compounds tend to inhibit the catalytic action of Component (C), the preferred free radical scavenger is essentially free of sulfur.

In preferred embodiments, Component (D) is selected from the group consisting of:
i. octadecyl 3-(3,5-di-tert-butyl-4-hydroxyphenyl) propionate;
ii. tetrakis(methylene-3-(3', 6'-Di-T-Butyl-4'-hydroxyphenyl) propionate)methane;
iii. styrenated phenol;
iv. phenol derivatives having a chemical abstract # 61788-44-1;
v. trilauryl trithio phosphite;
vi. tri(p-cresol)phosphite;
vii. triisooctyl phosphite;
viii. diphenyl isodecyl phosphite;
ix. dinonylphenyl bis(nonylphenyl) phosphite having the formula $C_{54}H_{87}O_3P$;
x. an alkyl-aryl phosphite having the formula $C_{30}H_{55}O_3P$; and
xi. mixtures thereof.

In more preferred embodiments, Component (D) is selected from the group consisting of octadecyl 3-(3,5-di-tert-butyl-4-hydroxyphenyl)propionate; trilauryl trithio phosphite; styrenated phenols; and mixtures thereof.

Because sulfur-containing compounds tend to inhibit the catalytic action of Component (C), the preferred free radical scavenger is free of reactive sulfur.

In preferred embodiments, the amount of the free radical scavenger that is present in the composition of the present invention, is 0.001 to 8 wt. %, based on the sum of the weights of Components (A) through (D). If more than 8 wt. % of the free radical scavenger is used in the present composition, excessive cure inhibition at the surface of the polyester parts which is cast in the silicone elastomer mold made from such composition will be present. If less than 0.001 wt. % of the free radical scavenger is used, then mold life increase of the resulting silicone elastomer mold will be negligible. In more preferred embodiments, the amount of free radical scavenger will be 0.001 wt. % to 4 wt. %. In most preferred embodiments, the amount will be 0.004 wt. % to 2 wt. % of the sum of the weights of components (A) through (D).

When Component (D) is octadecyl 3-(3,5-di-tert-butyl-4-hydroxyphenyl) propionate, the preferred amount of Component (D) in the present composition is 0.001 wt. % to 0.5 wt. %, more preferably 0.004 wt. % to 0.07 wt. %. When Component (D) is trilauryl trithio phosphite, the preferred amount of Component (D) in the present composition is 0.5 wt. % to 4 wt. %, more preferably 1.5 wt. % to 2 wt. %. The preferred styrenated phenol is a mixture of monostyrenated phenol, distyrenated phenol, and tristyrenated phenol. When Component (D) is a mixture of monostyrenated phenol, distyrenated phenol, and tristyrenated phenol, the preferred amount of Component (D) in the present composition is 0.001 wt. % to 0.5 wt. %, more preferably 0.003 wt. % to 0.06 wt. %. In preferred embodiments of the present invention, Component (D) is a liquid at 25° C. or is soluble in Component (A) or Component (B).

When an organosiloxane elastomer mold is used to make polyester castings, the curable polyester composition is poured or otherwise dispensed into the organosiloxane elastomer mold. The curable polyester composition cures to form a polyester casting. The casting is then pulled from the mold and the process can be repeated to make another casting from the same mold. The curable polyester composition has a tendency to leach or otherwise diffuse into the organosiloxane elastomer mold. As the curable polyester composition that is contained within the mold cures, the mold will begin to distort. The distortion and deterioration of the mold is progressive as additional polyester castings are made in that mold. The distortion and deterioration is minimized when the organosiloxane composition used to make the organosiloxane elastomer mold contains a free radical scavenger for styrene free radical polymerization radicals. The present inventors discovered that when the organosiloxane elastomer mold is prepared using an organosiloxane composition containing Component (D), the cure of the polyester composition that has leached into the mold is inhibited. The mold, therefore, experiences less distortion and deterioration and has a longer life.

Curable polyester compositions are typically comprised of an unsaturated polyester base resin and styrene monomers. Free radical styrene polymerization occurs as part of the process of curing the curable polyester composition. Component (D) functions to scavenge the free radicals that participate in the free radical styrene polymerization and thereby prevent the curable polyester composition which has leached into the organosiloxane elastomer mold from curing within that matrix. The distortion and deterioration of the organosiloxane elastomer mold that occurs upon cure of the curable polyester composition is thereby minimized and the moldlife of the organosiloxane composition is thereby increased.

Optional Components

Compositions of the present invention may contain additional ingredients to modify the properties of the curable compositions or cured materials prepared using the compositions. These additional ingredients include, but are not limited to, liquid diluents, reinforcing fillers such as finely divided silica of the fume or precipitated type, non-reinforcing fillers such as quartz and calcium carbonate, surfactants, stabilizers to inhibit degradation in the presence of heat and/or ultraviolet light, dyes, pigments, working time extenders, and flame retardants. Non-reactive polyorganosiloxanes are a preferred class of diluents. The preferred non-reactive polyorganosiloxane diluent is trimethylsiloxy-terminated dimethylsiloxane.

Fillers and other optional components can be packaged either with the base or with the curing agent or with both.

Preparation and Curing of Curable Compositions

The curable compositions of this invention are prepared by blending all of the components together. Curing begins when Component (A) is mixed with Component (B) in the presence of the hydrosilylation reaction catalyst. Complete cure requires from several minutes to several hours, depending upon, among other things, the temperature, the type and concentration of crosslinker, and the type and concentration of catalyst.

When the composition of the present invention is in the form of a two or more part system, the composition is prepared by preparing a base and a curing agent and then mixing the base and curing agent. Curing begins when the base and curing agent are mixed. When the curable compositions of the present invention are prepared using a base and curing agent, the mix ratio can vary, depending upon the formulation of each part, from about 1:1 to about 40:1, parts base per part curing agent. Typical mix ratios are 1:1, 10:1 and 20:1.

The present invention also relates to a multi-part system comprising:

A) an alkenyl-containing polyorganosiloxane having an average of at least two silicon-bonded alkenyl groups per molecule;

B) an organohydrogensiloxane having an average of at least two silicon-bonded hydrogen atoms per molecule;

C) a hydrosilylation reaction catalyst, in an amount sufficient to accelerate the curing of the composition; and D) a free radical scavenger for radicals that participate in the free radical polymerization of styrene; wherein the sum of the average number of silicon-bonded alkenyl groups in Component (A) and the average number of silicon-bonded hydrogen atoms per molecule in Component (B) is great than 4.

When the composition of the present invention is in the form of a two or more part system, the composition is prepared by preparing a base and a curing agent and then mixing the base and curing agent. The part which contains Component (A) is typically referred to as the base. The part which contains Component (B) is typically referred to as the curing agent. Curing begins when the base and curing agent are mixed. When the curable compositions of the present invention are prepared using a base and curing agent, the mix ratio can vary, depending upon the formulation of each part, from about 1:1 to about 40:1, parts base per part curing agent. Typical mix ratios are 1:1, 10:1 and 20:1.

In a preferred embodiment of the present invention, Component (D) is admixed with Component (A) before Component (A) is admixed with the other components of the composition. Prior to the addition of Component (D), the temperature of Component (A) should preferably be greater than 25° C.

The present invention also provides a method for increasing moldlife of a silicone elastomer mold, said method comprising the steps of:

I. preparing a curable organosiloxane composition comprising:
   A) an alkenyl-containing polyorganosiloxane having an average of at least two silicon-bonded alkenyl groups per molecule;
   B) an organohydrogensiloxane having an average of at least two silicon-bonded hydrogen atoms per molecule;
   C) a hydrosilylation reaction catalyst, in an amount sufficient to accelerate the curing of the composition; and
   D) a free radical scavenger for radicals that participate in the free radical polymerization of styrene; wherein the sum of the average number of silicon-bonded alkenyl groups in Component (A) and the average number of silicon-bonded hydrogen atoms per molecule in Component (B) is great than 4;

II. curing the curable organosiloxane composition in a master mold to form a silicone elastomer mold;

III. preparing a curable polyester composition comprising a styrene monomer;

IV. dispensing the curable polyester composition into the silicone elastomer mold;

V. allowing the curable polyester composition to cure to form a polyester casting;

VI. removing the polyester casting from the silicone elastomer mold; and optionally, VII. repeating steps III. through VI. until the silicone elastomer mold deteriorates to the point where the last polyester casting pulled from the silicone elastomer mold is not an accurate reproduction of the master mold. The accuracy of the reproduction can be determined by physically comparing the first polyester casting pulled from the silicone elastomer mold to the last polyester casting pulled from the silicone mold or by measuring changes in the silicone elastomer mold itself. The present inventors have found the Start Wave, Medium Wave, End Wave, and Consecutive Chunking determinations to be a convenient and consistent method for determining whether a casting will be an accurate reproduction of the master mold and for assessing the moldlife of a silicone elastomer mold. Start Wave, Medium Wave, End Wave, and Consecutive Chunking are described below.

The elastomers prepared using the present compositions are suitable for use in a variety of end use applications, including as sealants, coating materials, and as pottants or encapsulants for electrical and electronic devices. The compositions are particularly useful for preparing molds.

EXAMPLE

The following example describes a preferred curable composition of the present invention, and should not be interpreted as limiting the invention defined in the accompanying claims. Unless otherwise indicated all parts and percentages in the example are by weight and viscosities are the values measured at 25° C.

For each of Comparative Example 1 and Example 1, a silicone elastomer mold was prepared by curing a curable composition. The curable composition was prepared by admixing a base and a curing agent at a mix ratio of 10:1.

Each silicone elastomer mold was prepared by pouring 45 grams of the curable composition into a master mold. The composition was then de-aired, under a vacuum of 29 inches (760 mm) of Hg for 4 minutes. Another 45 grams of the same curable composition was poured into the master mold and de-aired.

The master mold consisted of an aluminum cone bolted to an aluminum support flange which had been sprayed with a "TEFLON" mold release compound (Miller Stephenson MS-136N/CO2), and a polyvinyl chloride sleeve. "TEFLON" is a registered trademark of E.I. DuPont DeNemours and Company of Wilmington, Del. The cone had a base of 1 3/16 inches, a height of 2 3/4 inches, three wedge shaped tapering cut sections, and 9 holes evenly spaced over the surface of the cone. Because the cone of the master mold has these wedge shaped tapering cut sections, the silicone elastomer mold made from the master mold has corresponding wedge shaped tapering protrusions which are called vanes. Because the cone of the master mold has these 9 holes, the silicone elastomer mold made from the master mold has 9 corresponding cylindrically shaped projections which are called pegs.

The mold life of a silicone elastomer mold is a measure of the number of accurately reproduced parts that can be cast from that mold. Because the casting process and other factors cause changes in the silicone elastomer mold, the number of parts, or "castings", which can be made from a single silicone elastomer mold is not infinite. As the number of castings which have been made from a particular silicone elastomer mold increases, so does the deterioration in the silicone elastomer mold. This deterioration can take various forms. Common forms of deterioration include changes in the physical dimensions or characteristics of the silicone elastomer mold. As the silicone elastomer mold changes, so do the parts casts from such a mold. When changes in the silicone elastomer mold are sufficiently great, the parts cast from such a mold will not be an accurate reproduction of the master mold. The number of parts that can be produced from a silicone elastomer before the parts are unacceptable is the mold life of the silicone elastomer mold.

Changes in the fine details, such as the vanes or pegs, of a silicone elastomer mold will be reproduced in the corresponding fine details of the casting. Such changes indicate that the silicone elastomer mold has begun to deteriorate. When the mold deteriorates to the point that the casting produced from such a mold is not sufficiently accurate, the user will begin using a new mold.

Evidence of the deterioration of the silicone elastomer molds of the present examples can be first detected at the line of the apex of the wedge shaped tapering cut of the casting. The first parts produced from such a silicone elastomer mold will have a apex which is a straight line. As the mold deteriorates, the line of the apex of the wedge shaped tapering cut of the casting will begin to have a wavy appearance. This wavy line appearance is due to changes in the line of the apex of the wedge shaped tapering protrusions of the silicone elastomer mold. The number of castings which will be produced before the amplitude of the wavy line of the apex of the wedge shaped tapering cut of the casting is greater than 0.75 mm is called the "Start Wave". The number of castings which will be produced before the amplitude of this wavy line is greater than 1 mm is called the "Medium Wave". The number of castings which will be produced before the amplitude of this wavy line is greater than 1.5 mm is called the "End Wave". The number of castings which will be produced before consecutive pieces of the elastomer are pulled from the mold is called "Consecutive Chunking". In many moldmaking applications, such as where fine details are critical, a silicone elastomer mold will only be used until a point in time corresponding to Start Wave. The larger the number of parts that are produced before Start Wave, the longer the mold life. In other applications, a silicone elastomer mold will be used until a point in time corresponding to Medium Wave. In this case the larger the number of parts that are produced before Medium Wave, the longer the mold life. In some applications where fine details are not critical, customers may use a silicone elastomer until the point in time corresponding to End Wave. In such cases, the larger the number of parts that are produced before End Wave, the longer the mold life. In yet other applications, customers may use a silicone elastomer until the point in time corresponding to Consecutive Chunking. In such cases, the larger the number of parts that are produced before Consecutive Chunking, the longer the mold life. Therefore, the greater the number of parts that can be cast from a silicone elastomer mold before the onset of Start Wave, Medium Wave, End Wave, or Consecutive Chunking, the greater the mold life of that silicone elastomer mold.

Except as noted below, the silicone elastomer molds used in Comparative Example 1 and Example 1 were prepared by allowing the curable compositions to cure for 24 hours in a master mold. The aluminum cones were then removed and robotic moldlife testing was begun.

Moldlife testing was completed by counting the number of casting that could be prepared from each silicone elastomer mold before Start Wave, Medium Wave, End Wave and Consecutive Chunking. The castings were prepared from a polyester casting resin. For Examples 1 and Comparative Examples 1, the polyester casting resin was prepared by admixing 23 grams of "SILMAR" S-40 polyester resin containing 0.10% N, N dimethylaniline and 0.010% cobalt napthenate and 0.3 grams of "LUPERSOL" DDM-9 catalyst. LUPERSOL" is a registered trademark of Pennwalt Corporation of Philadelphia, Pa. The polyester casting resin was poured into the silicone elastomer mold and allowed to cure for twenty minutes at room temperature to form a casting. The casting was pulled from the silicone elastomer mold and inspected for indications of Start Wave, Medium Wave, End Wave or other defects. The experiment was repeated using the same cured silicone elastomer mold and newly mixed and cured polyester resin until End Wave conditions were met or the silicone elastomer mold otherwise failed. The number of castings made with each silicone elastomer mold is reported on Table 1. In order to eliminate variability the experiment was conducted using a robotic moldlife tester.

Comparative Example 1

Base: 100 Parts of an admixture of
61.9 parts of dimethylvinylsiloxy-terminated dimethylsiloxane
29 part trimethylated silica
7 parts of dimethylhexenylsiloxy-terminated methylhexenylsiloxane-dimethylsiloxane copolymer
0.008 parts of chloroplatinic acid complex of divinyltetramethyldisiloxane diluted with dimethylvinylsiloxy-terminated polydimethylsiloxane to provide 0.88 weight percent platinum
2 parts zirconium silicate
Curing Agent: 10 parts of an admixture of
30 parts of dimethylvinylsiloxy-terminated dimethylsiloxane
2 parts of methylhydrogensiloxane
2 parts of methylvinylcyclosiloxanes
57 parts dimethylhydrogen-terminated dimethylsiloxane Example 1

Base: 100 parts of the base of Comparative Example 1
Curing Agent:
10 Parts of curing agent of Comparative Example 1
0.0005 Parts octadecyl 3-(3,5-di-tert-butyl,4-hydroxyphenyl)propionate

TABLE 1

| | Comparative Example 1 | Example 1 |
| --- | --- | --- |
| Start Wave | 31 | 47 |
| Medium Wave | 41 | 62 |
| End Wave | 72 | 69 |
| Consecutive Chunking | 73 | 69 |

That which is claimed is:

1. A method of increasing the mold life of a silicone elastomer mold, said method comprising the steps of:
    I) preparing a curable organosiloxane composition, comprising:
        A) an alkenyl-containing polyorganosiloxane having an average of at least two silicon-bonded alkenyl groups per molecule;
        B) an organohydrogensiloxane having an average of at least two silicon-bonded hydrogen atoms per molecule;
        C) a hydrosilylation reaction catalyst, in a concentration sufficient to promote curing of a mixture of Component (A) and Component (B); and
        D) a free radical scavenger for radicals that participate in the free radical polymerization of styrene;
    wherein the sum of the average number of silicon-bonded alkenyl groups in Component (A) and the average number of silicon-bonded hydrogen atoms per molecule in Component (B) is great than 4;
    II) preparing a curable polyester composition comprising a styrene monomer;
    III) curing the curable organosiloxane composition to form a silicone elastomer mold;
    (IV) casting parts in the silicone elastomer mold using a curable polyester composition; and
    (V) curing the curable polyester composition to form a cured polyester part; and
    (VI) removing the cured polyester part from the silicone elastomer mold.
2. A method of increasing the mold life of a silicone Elastomer mold, said method comprising the steps of:
    I) preparing a curable organosiloxane composition, comprising:
        A) an alkenyl-containing polyorganosiloxane having an average of at least two silicon-bonded alkenyl groups per molecule;
        B) an organohydrogensiloxane having an average of at least two silicon-bonded hydrogen atoms per molecule;
        C) a hydrosilylation reaction catalyst, in a concentration sufficient to promote curing of a mixture of Component (A) and Component (B); and
        D) a free radical scavenger for radicals that participate in the free radical polymerization of styrene wherein the sum of the average number of silicon-bonded alkenyl groups in Component (A) and the average number of silicon-bonded hydrogen atoms per molecule in Component (B) is great than 4;
    II) utilizing the curable organosiloxane composition of I) to form a mold;
    III) curing the cureable organosiloxane composition to provide a mold having an enhanced mold life.
3. A method of molding polyester articles wherein the molds used therein are prepared by a method as claimed in claim 2.
4. A method of molding polyester articles wherein a mold is prepared by a method as claimed in claim 2, and wherein the method of molding polyester articles includes:
    i) preparing a curable polyester composition comprising a styrene monomer;
    ii) casting a curable polyester composition into the mold;
    iii) curing the polyester composition, and
    iv) removing the cured polyester part from the mold.
5. The method of claim 4, further comprising repeating the steps of i) to iv) utilizing the same mold.

* * * * *